United States Patent
Middleman et al.

(10) Patent No.: US 10,264,008 B2
(45) Date of Patent: Apr. 16, 2019

(54) VULNERABILITY EXPOSING APPLICATION CHARACTERISTIC VARIATION IDENTIFICATION ENGINE

(71) Applicant: BANK OF AMERICA CORPORATION, Charlotte, NC (US)

(72) Inventors: Daniel Edward Middleman, The Colony, TX (US); John Henry Denning, Alexandria, VA (US); Keith Allen Topel, Lancaster, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 14/878,621

(22) Filed: Oct. 8, 2015

(65) Prior Publication Data

US 2017/0104779 A1    Apr. 13, 2017

(51) Int. Cl.
  *G06F 21/57*    (2013.01)
  *H04L 29/06*    (2006.01)
  *G06F 3/0484*   (2013.01)

(52) U.S. Cl.
  CPC ........ *H04L 63/1433* (2013.01); *G06F 3/0484* (2013.01); *G06F 21/577* (2013.01); *H04L 63/20* (2013.01)

(58) Field of Classification Search
  CPC ..................................................... H04L 63/20
  See application file for complete search history.

(56) References Cited

U.S. PATENT DOCUMENTS

| | | | |
|---|---|---|---|
| 6,205,552 B1 | 3/2001 | Fudge | |
| 7,032,229 B1 | 4/2006 | Flores et al. | |
| 7,191,435 B2 * | 3/2007 | Lau | G06F 8/65 714/38.1 |
| 7,698,419 B2 | 4/2010 | Flores et al. | |
| 7,849,448 B2 | 12/2010 | Yunus et al. | |
| 8,200,615 B2 | 6/2012 | Halliday | |
| 8,255,899 B2 | 8/2012 | Halliday | |
| 8,752,040 B2 | 6/2014 | Halliday | |
| 8,812,960 B1 * | 8/2014 | Sun | H04L 61/6077 715/757 |
| 9,195,829 B1 * | 11/2015 | Goradia | G06F 11/362 |
| 9,396,237 B1 * | 7/2016 | Shah | G06Q 10/10 |
| 2003/0233581 A1 | 12/2003 | Reshef et al. | |

(Continued)

*Primary Examiner* — Madhuri R Herzog
(74) *Attorney, Agent, or Firm* — Michael A. Springs; Moore & Van Allen PLLC; Nicholas C. Russell

(57) ABSTRACT

Embodiments of the invention are directed to a system, method, or computer program product for an engine for exposing vulnerability within applications based on application characteristic identification. In this way, the engine identifies existing data sets that aid in understanding the possible privacy vulnerabilities associated with technologies such as applications, operated by an entity. The engine comprises dials and levers that allow for prioritization visualization of vulnerabilities critical to a particular portion of the entity. In this way, a user can drive the application engine allowing them to narrow the focus on any number of variations of application characteristics including, but not limited to types of vulnerabilities, status of the vulnerabilities, critical applications, regulated applications, vulnerabilities, business continuity and/or accessibility to the applications.

17 Claims, 6 Drawing Sheets

(56) References Cited

U.S. PATENT DOCUMENTS

| | | |
|---|---|---|
| 2005/0049973 A1* | 3/2005 | Read .................. G06Q 10/06 |
| | | 705/59 |
| 2005/0193430 A1 | 9/2005 | Cohen et al. |
| 2005/0223239 A1* | 10/2005 | Dotan .................. G06F 21/52 |
| | | 713/188 |
| 2006/0195588 A1 | 8/2006 | Pennington et al. |
| 2006/0218640 A1 | 9/2006 | Lotem et al. |
| 2008/0244433 A1* | 10/2008 | Behnen ............. G06F 17/30864 |
| | | 715/771 |
| 2012/0198557 A1 | 8/2012 | Pistoia et al. |
| 2012/0272322 A1 | 10/2012 | Pistoia et al. |
| 2013/0007886 A1 | 1/2013 | Tripp et al. |
| 2013/0031635 A1 | 1/2013 | Lotem et al. |
| 2013/0055397 A1 | 2/2013 | Amit et al. |
| 2013/0055402 A1 | 2/2013 | Amit et al. |
| 2013/0055403 A1 | 2/2013 | Pennington et al. |
| 2013/0086147 A1 | 4/2013 | Kashyap |
| 2013/0179979 A1 | 7/2013 | Pistoia et al. |
| 2013/0238690 A1 | 9/2013 | Kashyap |

\* cited by examiner

VULNERABILITY EXPOSING APPLICATION CHARACTERISTIC VARIATION IDENTIFICATION ENGINE

BACKGROUND

Traditionally, entities have large information technology infrastructures for maintaining and installing applications across computer systems and maintaining general workflow within the entity. Typically the information technology infrastructure comprises several mainframe servers that include applications that require deployment among users based on user application needs.

Each application within the information technology infrastructure may have security implications to the entity. Typically, these security matters are reviewed and managed on an application by application view. With advancements in technology and continue integration of applications, it because increasingly challenging to monitor the information technology infrastructure security implication prior to a security issue.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for an engine for exposing vulnerability within applications based on application characteristic various identification. In this way, the engine identifies existing data sets that aid in understanding the possible privacy vulnerabilities associated with technologies such as applications, operated by an entity. The engine comprises dials and levers that allow for prioritization visualization of vulnerabilities critical to a particular portion of the entity. In this way, a user can drive the engine allowing them to narrow the focus on any number of variations of application characteristics including, but not limited to types of vulnerabilities, status of the vulnerabilities, critical applications, regulated applications, vulnerabilities, business continuity and/or accessibility to the applications. As such, the system provides a means for a user to identify one or more applications in a suite of applications that may provide security issues relative to a particular aspect of the entity business. As such, the invention provides a significant advantage over current security issue identification based on the exacting filtering and visualization of a holistic entity application view.

Currently, large entities have large information technology infrastructures, which include large mainframe environments. These environments may include multiple logical partitions, database management systems, and the like. As such, application or service rollouts and/or customization demands from one or more users may occur at different phases within the mainframe environment's multiple logical partitions. Not only at different phases, but also at different requirements for each application. Furthermore, in a large mainframe environment there are typically multiple users all with different application requirements and different functionality requirements within any one or more applications. With the large amount of application rollouts occurring regularly, security issues arise including regulatory requirements, privacy impacts, or the like.

In the current infrastructure environment, keeping track of security vulnerabilities occurs at the team or line of business level. As such, the present invention providing a privacy evaluation engine for tracking of security vulnerabilities with the ability to prioritize the vulnerabilities based on use requirements.

In this way, the system is designed to ensure security of an entity's high risk applications. As such, the system is generated to create a repeatable and scalable process that prevents application defects from reaching production state where they can be exploited and cause impact to the entity. The system may track vulnerability issues based on applications.

Embodiments of the invention relate to systems, methods, and computer program products for exposing application vulnerability, the invention comprising: compiling applications available across an entire entity into a centralized location database; examining information security criteria and business criteria for the applications; generating a weighted asset security value based on the information security criteria and the business criteria for the application; identifying application characteristic variables in the compiled applications available across the entity; presenting to a user, via an interface communicated to the user via a secure communicable link, wherein the interface comprises selectable filters associated with the application characteristics; generating an interactive graphical interface comprising two or more graphical axis, wherein one axis comprises the weighted asset security value and a second axis comprises filtered application characteristics, wherein the applications are represented by selectable indicators within the interactive graphical interface; and presenting on demand detailed information about one or more applications selected or highlighted in the interactive graphical interface for security follow up.

In some embodiments, generating the interactive graphical interface comprises plotting applications as indicators across an x-axis comprising the weighted asset security value and a y-axis comprising the filtered application characteristics, wherein the indicators are selectable and present detailed real-time information about the application associated with the indicator.

In some embodiments, examining information security criteria comprises identifying applications that include non-public information and third party managed information, wherein examining business criteria for the applications comprises identifying a peak of concurrent uses for the application within the entity and a restore time for the application. In some embodiments, generating a weighted asset security value comprises weighing the information security criteria 80% and weighing the business criteria 20%.

In some embodiments, the invention further comprises storing the weighted asset security value permanently for each application.

In some embodiments, identifying application characteristic variables in the compiled applications available across the entity further comprises identifying applications associated with variables in privacy, leadership, third party contacts, criticality, vulnerabilities, continuity, asset information, and accessibility.

In some embodiments, presenting on demand detailed information about one or more applications selected or highlighted in the interactive graphical interface for security follow up, further comprises presenting the user with security detail specifics for the application to expose application vulnerabilities relevant to the filters.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
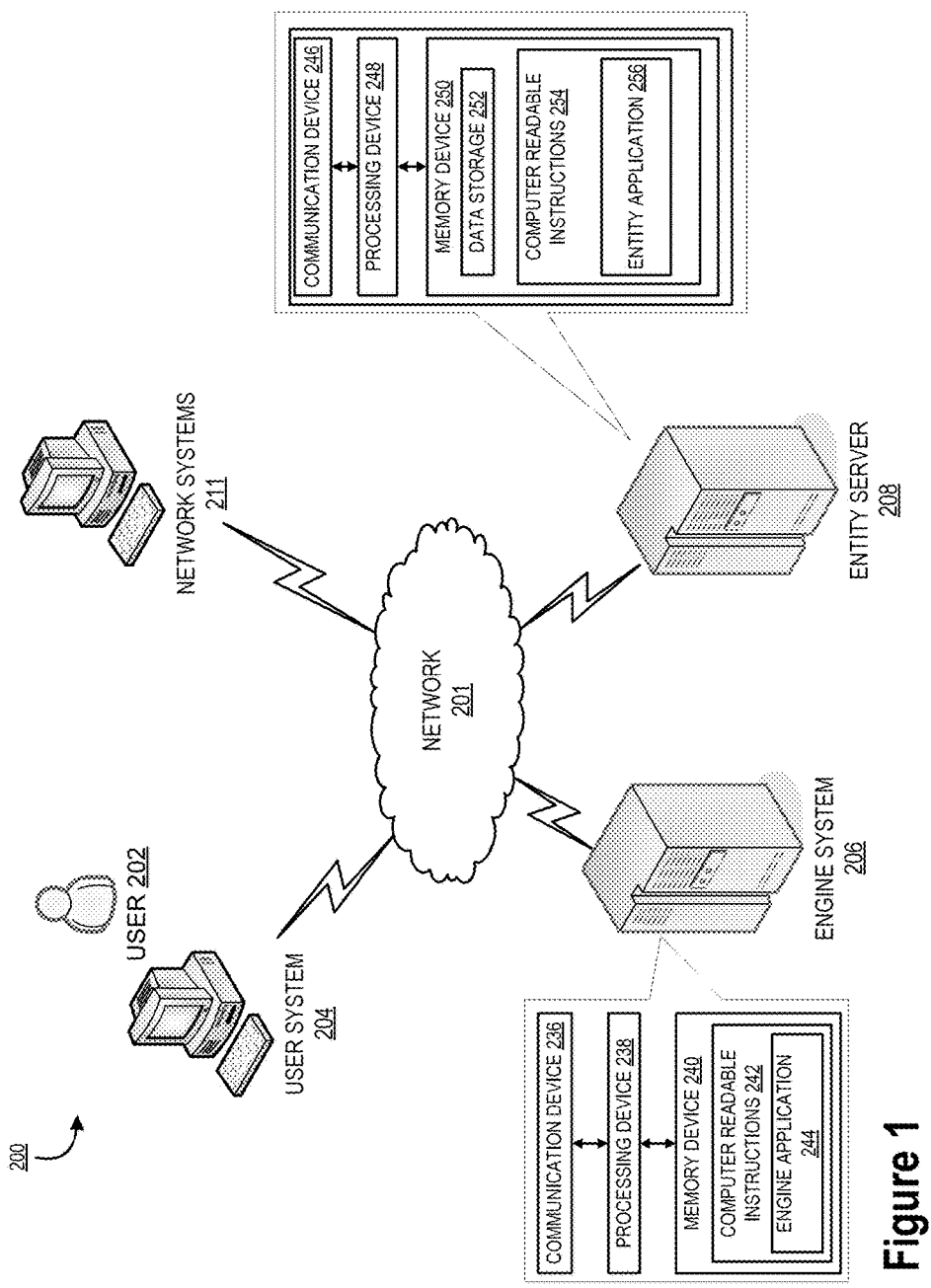
Figure 2:
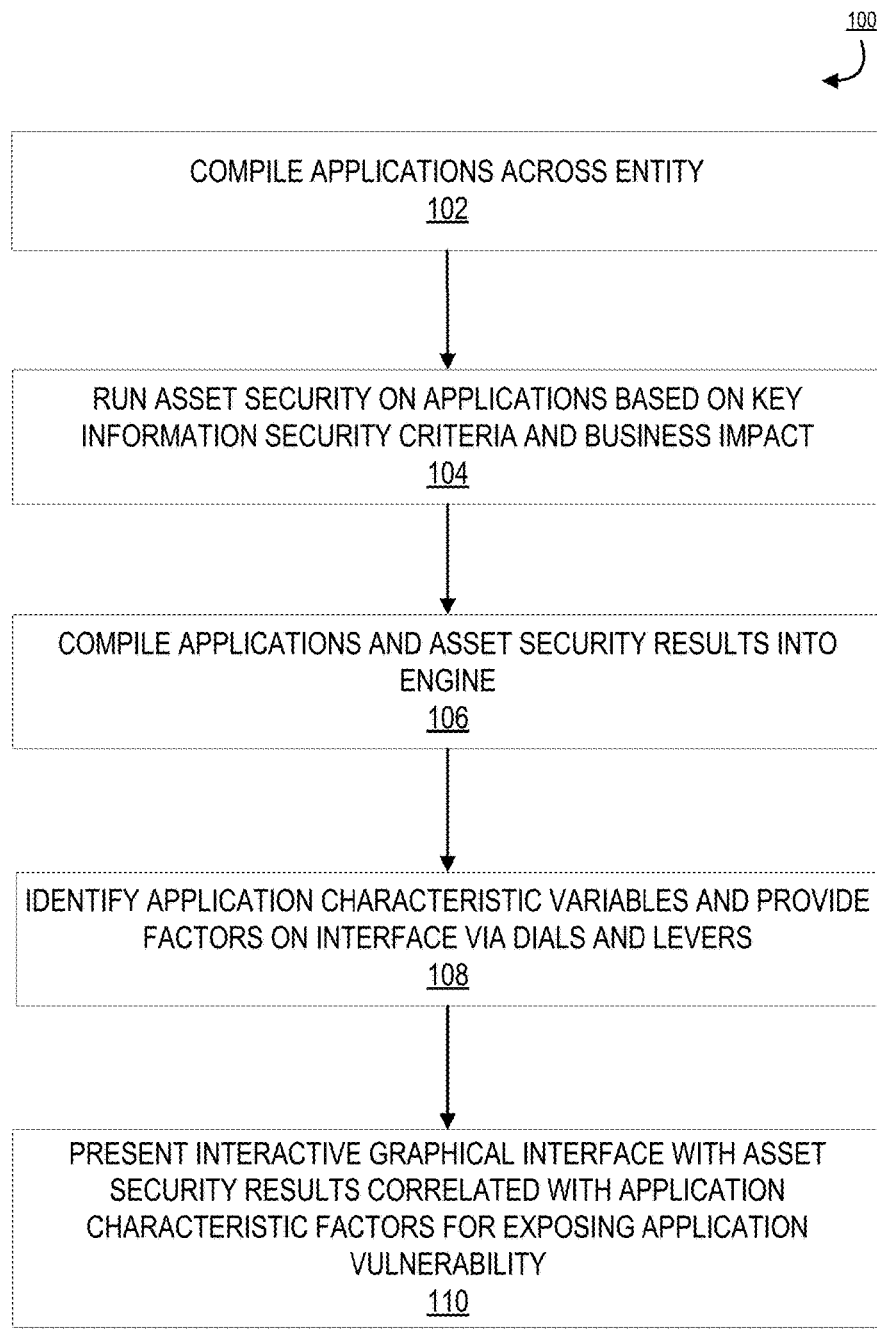
Figure 3:
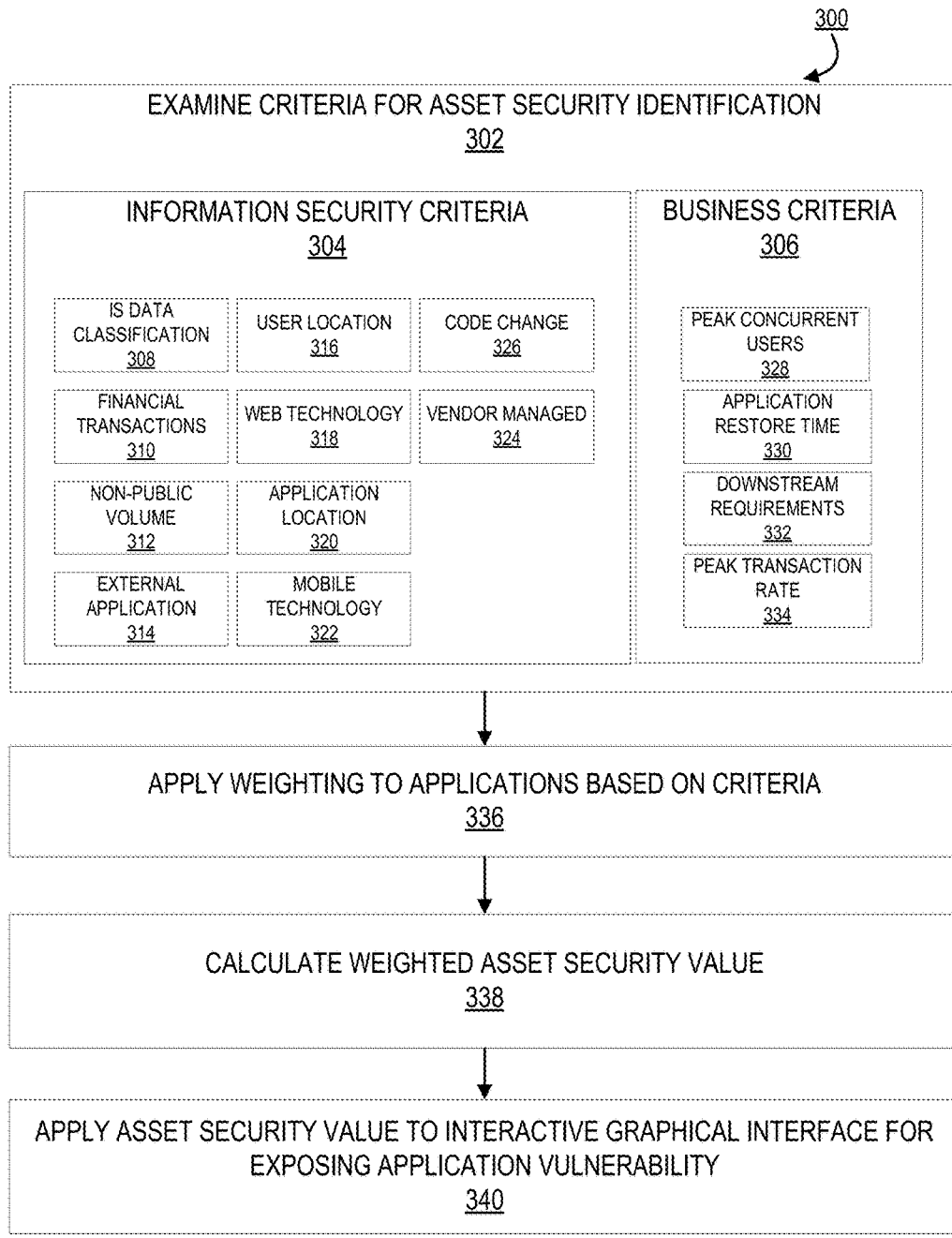
Figure 4:
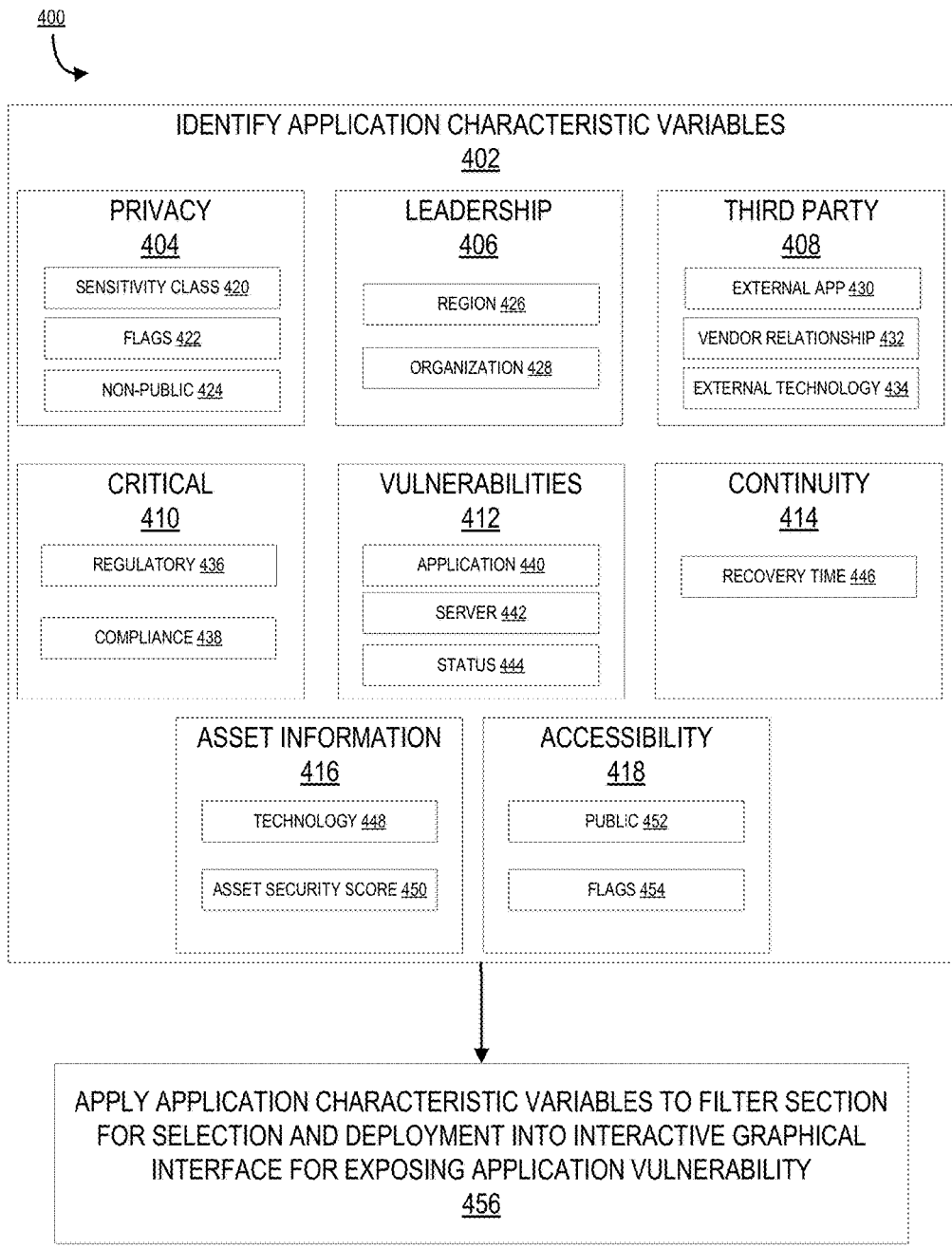
Figure 5:
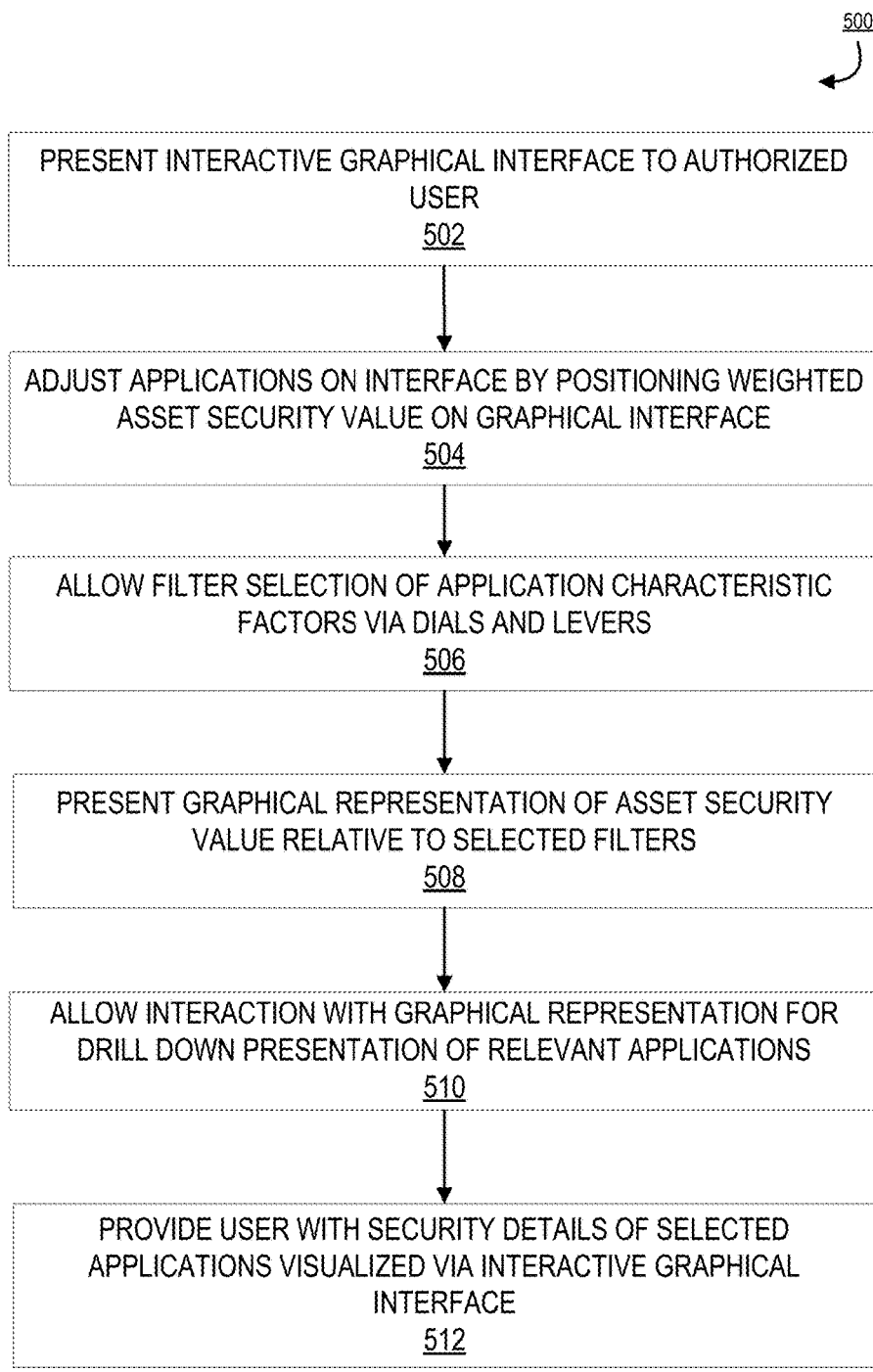
Figure 6:
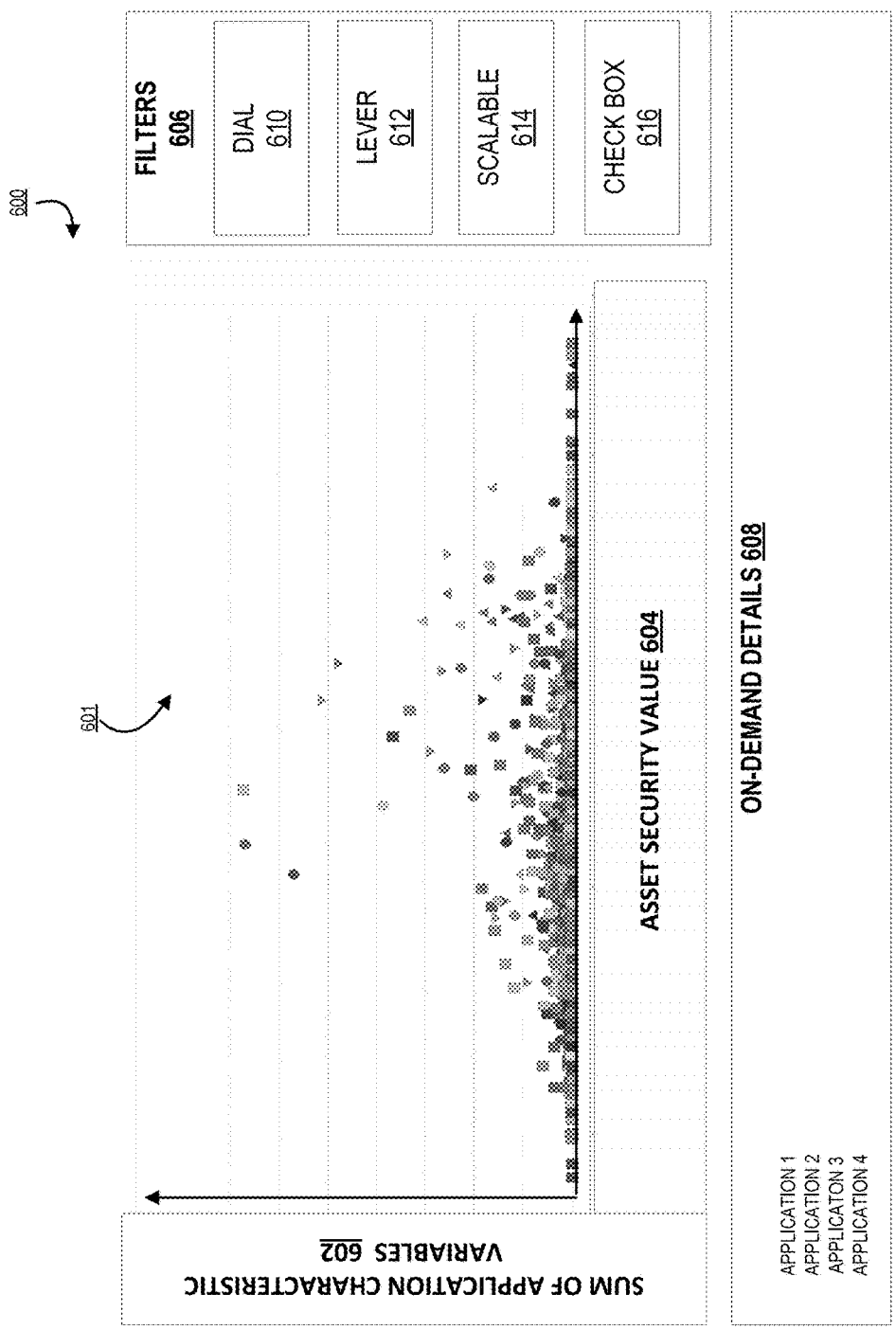

Having thus described embodiments of the invention in general terms, reference will now be made the accompanying drawings, wherein:

FIG. 1 provides an illustration of an engine system environment for exposing vulnerabilities, in accordance with various embodiments of the invention;

FIG. 2 provides a high level process flow illustrating the vulnerability exposing application characteristic variation identification engine process, in accordance with embodiments of the invention;

FIG. 3 provides a high level process flow illustrating the process of generating asset security values for the engine, in accordance with embodiments of the invention;

FIG. 4 provides a high level process flow illustrating the process of generating application characteristic variables for the engine, in accordance with an embodiment of the invention;

FIG. 5 provides an illustration of the process of using the engine to expose vulnerabilities, in accordance with an embodiment of the invention; and FIG. 6 provides an interface associated with the engine, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user" or "agent." It will be appreciated by someone with ordinary skill in the art that the user may be an individual, financial institution, corporation, or other entity that may have been involved in the reviewing or monitoring vulnerabilities within applications associated with the entity.

In accordance with embodiments of the invention, the term "information technology" as used herein refers to the totality of interconnecting hardware and software that supports the flow and processing of information. Information technology include all information technology resources, physical components, and the like that make up the computing, internet communications, networking, transmission media, or the like of an entity.

Currently, large entities have large information technology infrastructures, which include large mainframe environments. These environments may include multiple logical partitions, database management systems, and the like. As such, multiple maintenance rollouts may occur at different phases within the mainframe environment's multiple logical partitions. Furthermore, in a large mainframe environment, there are typically multiple copies of the software libraries all with different maintenance required with no easy way of knowing the specific vulnerability levels for security for the software contained in each of the libraries.

Furthermore, applications may be referred to throughout, these applications may be any type of software or hardware application that a user within an entity may desire or require. Applications may be distributed throughout the entity and customized at various different levels for user utilization. As such, there is a need to monitor the security of these applications in a centralized engine that allows for searchability for a specific user security monitoring requirements.

As such, the present invention providing an entity wide application engine for visualizing and prioritize vulnerabilities that may be critical to the user. Thus the system removes the complexity and difficulty generating a centralized location for security monitoring across the entity to provide a uniform, stable, and searchable security monitoring means.

Embodiments of the invention are directed to a system, method, or computer program product for a distributive network system with specialized data feeds associated with the distributive network for identifying existing data sets that identify vulnerabilities with the entity infrastructure.

FIG. 1 provides an illustration of an engine system environment for exposing vulnerabilities 200, in accordance with various embodiments of the invention. As illustrated in FIG. 1, the entity server 208 (or mainframe) is operatively coupled, via a network 201 to the user system 204, network systems 211, and the engine system 206. In this way, the entity server 208 can send information to and receive information from the user system 204, network systems 211, and the engine system 206 to facilitate the vulnerability exposing application characteristic variation identification engine.

FIG. 1 illustrates only one example of an embodiment of system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that has an affiliation with the entity. In some embodiments, the user 202 may be a programmer or the like associated with maintaining the entity's information technology infrastructure. As such, the user 202 may desire to visualize security implications within applications ran across the entity. In some embodiments, the user 202 may be an individual or business with a relationship with the entity that reviews security issues associated with the entity application deployment and use. Furthermore, multiple individuals or entities may comprise a user 202.

FIG. 1 also illustrates a user system 204. The user system 204 is operatively coupled to the entity server 208, network systems 211, and/or the engine system 206 through the network 201. The user system 204 has systems with devices the same or similar to the devices described below for the entity server 208 and/or the engine system 206 (e.g., communication device, processing device, and memory device). Therefore, the user system 204 may communicate with the entity server 208, network systems 211, and/or the engine system 206 in the same or similar way as described with respect to each system.

The user system 204, in some embodiments, is comprised of systems and devices that allow for a user 202 to access applications within the entity and receive the interactive graphical interface associated with the request customizable applications via secure communication channels associated with the engine. A "user device" 204 may be any computer communication device or mobile device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, desktop computers, cameras, video recorders, audio/video player, radio, GPS devices, any combination of the aforementioned, or the like. Although only a single user system 204 is depicted in FIG. 1, the system environment 200 may contain numerous user systems 204, as appreciated by one of ordinary skill in the art.

As illustrated in FIG. 1, the entity server 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 248 uses the communication device 246 to communicate with the network 201 and other devices on the network 201, such as, but not limited to the user system 204, network systems 211, and/or engine system 206 over a network 201. As such, the communication device 246 generally comprises a modem, server, or other device for communicating with other devices on the network 201.

As further illustrated in FIG. 1, the entity server 208 comprises computer-readable instructions 254 stored in the memory device 250, which in one embodiment includes the computer-readable instructions 254 of an entity application 256. In some embodiments, the memory device 250 includes data storage 252 for storing data related to the entity application 256 including but not limited to data created and/or used by the entity application 256.

In the embodiments illustrated in FIG. 1 and described throughout much of this specification, the entity application 256 may provide the infrastructure for the entire entity and maintain and allow for running of applications within the entity.

In some embodiments, the entity application 256 maintains entity information technology. As such, the entity server 208 may maintain and update any and all application software and hardware associated with an entity. As such, the entity application 256 manages all application software installations and updates associated with the entity. In this way, the entity application 256 may communicate using the communication device 246 through the network 201 to the network systems 211 associated with agents of the entity. In some embodiments, the entity application 256 may also receive new application software or software updates for the entity's logical partitions and software associated with user systems 204 and network systems 211. Furthermore, the entity application 256 may communicate with the engine system 206 to provide application characteristics to the engine system 206 for integration into the engine.

As illustrated in FIG. 1, the engine system 206 generally comprises a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the entity server 208, the user system 204, and/or the network systems 211. As such, the communication device 236 generally comprises a modem, server, or other device for communicating with other devices on the network 201.

As further illustrated in FIG. 1, the engine system 206 comprises computer-readable instructions 242 stored in the memory device 240, which in one embodiment includes the computer-readable instructions 242 of an engine application 244. In some embodiments, the memory device 240 includes database storage for storing data related to the engine application 244 including but not limited to data created and/or used by the engine application 244.

In the embodiments illustrated in FIG. 1 and described throughout much of this specification, the engine application 244 stores applications, calculates a weighted asset security value, presents application characteristics for user filtering, filters application characteristics based on user input, and generates an interactive graphical interface.

In some embodiments, the engine application 244 stores applications. As such, the engine application 244 retrieves applications across the entity via the network 201. The engine application 244 may retrieve applications from the user systems 204, network systems 211, and/or the entity server 208. Once retrieved, the engine application 244 may store the applications.

In some embodiments, the engine application 244 calculates a weighted asset security value for the applications. In this way, the system may utilize predetermined information security criteria and business criteria to create a weighted asset security value for each application. In this way, the engine application 244 may review application information and generate a weighted score based on criteria. More detail regarding the calculation of a weighted asset value by the engine application 244 is described in further detail below with respect to FIG. 3.

In some embodiments, the engine application 244 presents application characteristics for user filtering. In this way, the engine application 244 may identify application characteristic variables for each of the applications. Once these application characteristics are identified, the engine application 244 may present the characteristics to a user 202 via an interface, such that the characteristics are filters for an interactive graphical interface for exposing application vulnerabilities. The engine application 244 may present the graphical interface to the user 202 over the network 201 via the user system 204. In this way, the user 202 must authorize to the engine application 244 via the user system 204 in order to be granted access to the interface.

In some embodiments, the engine application 244 filters application characteristics based on user input. In this way, the user 202 via the user system 204 may select filters associated with application characteristics desired by the user 202 for visualization via the interface. The engine application 244 may receive the selected filters and process those filters.

In some embodiments, the engine application 244 generates an interactive graphical interface. Once the user 202 selected filters are processed, the engine application 244 generates an interactive graphical view of the filters in relationship to the asset security value on a graphical plot map. The engine application 244 allows for this graphical representation to be interactive such that the user 202 may select one or more represented applications to receive more information associated with that application.

FIG. 1 also illustrates one or more network systems 211. The network systems 211 are operatively coupled to the entity server 208, user system 204, and/or the engine system 206 through the network 201. The network systems 211 have systems with devices the same or similar to the devices described for the entity server 208 and/or the engine system 206 (e.g., communication device, processing device, and memory device). Therefore, the network systems 211 may communicate with the entity server 208, user system 204, and/or the engine system 206 in the same or similar way as previously described with respect to each system. The network systems 211, in some embodiments, is comprised of systems and devices that allow for receiving applications and application bundles, receiving maintenance updates for running software, and the like. The network systems 211 are associated with the entity. In this way, the network systems 211 are computer systems associated with agents, users 202, or the like associated with lines of business, groups, subsidiaries, business partners, or the like associated with the entity.

FIG. 1 depicts only one network system 211 within the computing system environment 200, however, one of ordinary skill in the art will appreciate that a plurality of network systems 211 may be communicably linked with the network 201 and the other devices on connected to the network 201, such that each network system 211 is communicably linked to the network 201 and the other devices on the network 201.

FIG. 2 provides a high level process flow illustrating the vulnerability exposing application characteristic variation identification engine process 100, in accordance with embodiments of the invention. As illustrated in block 102, the process 100 is initiated when the system compiles applications and services from around the entity. In this way, the applications, application bundles, and other services available for use within the entity may be compiled and stored in a centralized database. As such, the system may identify all applications available to the entity for use. In some embodiments, the system may compile current applications with current licenses or the like available within the entity. In some embodiments, the applications may be provided from vendors that are available for use at the entity.

Next, once the applications have been compiled, the system may run asset security on the applications, as illustrated in block 104. Running an asset security application on all the applications available to the entity generates an asset value based on key information security criteria and business impact. This asset value gives the user a general sense of security issues present for that application. FIG. 3 below provides more detail into the asset security application and generation of the asset value associated with each application. The asset security value provides a view into the inherent security impact of each application. However, the asset security value is limited, and by itself cannot provide an indication of any residual security impact or patterns of impact.

As illustrated in block 106, the process 100 continues by compiling both the applications and asset security results into the engine for interactively providing details corresponding to the applications to a user based on filters selected by the user.

Next, as illustrated in block 108, the system may identify application characteristic variables and provide those factors on an interface via dials and levers. In this way, the factors which become filters on the interface that allows a user to visualizes applications that may be more critical to that user based on the filters. The filters are described in more detail below with respect to FIG. 4. Utilizing the application characteristic variables in combination with the asset security value identifies residual security issues that the asset security value may not identify on its own. Furthermore, this combination presentation illustrates patterns in security issues that are not identified otherwise.

Finally, the process 100 is completed by presenting an interactive graphical interface with asset security results correlated with application characteristics factors for exposing application vulnerability, as illustrated in block 110.

FIG. 3 provides a high level process flow illustrating the process of generating asset security values for the engine 300, in accordance with embodiments of the invention. As illustrated in block 302, the system may examine criteria for asset security identification. The system may generate a weighted asset security value to be incorporated into the vulnerability exposing application characteristic variation identification engine. The criteria for identifying the asset security value of each application comprises information security criteria 304 and business criteria 306. Each of the information security criteria 304 and business criteria 306 are weighted based on security issues that the application may present. Typically, the asset security value is 80% information security criteria and 20% business criteria.

As illustrated in block 304, information security criteria 304 include information systems classifications 308, financial transactions 310, non-public volume 312, external applications 314, user locations 316, web technology 318, application locations 320, mobile technology 322, code changes 326, and vender managed 324 criteria.

In some embodiments, information security criteria 304 include information systems classifications 308. Information systems classification 308 includes identifying whether the application is classified within the information systems group as being confidential, proprietary, or public. Typically, this criteria is given a highly preferential weight, as the information systems group has already identified and classified the application. In some embodiments, the information security criteria 304 also includes financial transactions 310. Financial transactions 310 criteria identify whether an application stores, controls, or reports on the movement of money, securities, trades, or other financial transactions.

Since financial transactions are critical to a business and business security, applications that perform this functionality are also weighted heavily. In some embodiments, the information security criteria 304 include non-public volume 312 criteria. The non-public volume 312 criteria identifies if the application contains non-public information about a user, a customer, or the entity. In some embodiments, the information security criteria 304 include external applications 314 criteria. The external applications 314 criteria identifies applications that are externally hosted applications. In this way, applications hosted externally are subject to the host's security and not the entity. In this way, the same security may not be provided. In some embodiments, the information security criteria 304 includes user locations 316 criteria. User location 316 criteria includes identifying applications that a user may use external to the entity infrastructure. In some embodiments, the information security criteria 304 includes web technology 318 criteria. Web technology 318 criteria includes identifying whether the application is a web technology driven application or not. In this way, web technology has additional security implications that may not be present in non-web based applications. In some embodiments, the information security criteria 304 includes application locations 320 criteria. The application locations 320 criteria includes an identification and weight provided to applications based on the location the application was developed in and/or is ran in. In some embodiments, the information security criteria 304 includes mobile technology 322 criteria. The mobile technology criteria 322 includes identifying applications that link to or utilize mobile technology to function. In some embodiments, the information security criteria 304 includes code changes 326 criteria. Code changes 326 criteria includes how often code changes are made to the application. In still other embodiments, the information security criteria 304 includes vendor managed 324 criteria. In this way, this criteria identifies applications that are managed externally from the entity, such as those applications managed by the vendor.

These information security criteria 304 identify applications that may meet one or more of the criteria listed above. If an application meets one of those criteria it is identified and provided with a weight factor associated with that criteria. As such, it marks the application as higher potential for security issues.

Along with the information security criteria 304, the system also identifies business criteria 306 associated with the applications of an entity. Business criteria 306 includes criteria such as peak concurrent users 238, application restore time 330, downstream requirements 332, and peak transaction rates 334.

In some embodiments, business criteria 306 includes peak concurrent users 238. Peak concurrent users 238 identifying the expected peak number of concurrent users. In some embodiments, business criteria 306 includes application restore time 330. Application restore time 330 identifies how long the application must be down before being restored during an outage or refresh. In some embodiments, business criteria 306 includes downstream requirements 332. Downstream requirements 332 identify how many additional applications are dependent on the application. In some embodiments, business criteria 306 includes peak transaction rates 334. Peak transaction rates 334 identifies a peak of use of the application.

These business criteria 306 identify relevant business factors that may lead to security issues. These business criteria 306 along with the information security criteria 304 identify applications and provided a weight factor associated with the applications that trigger the criteria. As illustrated in block 336, the system may apply a weighting to the applications identified in the criteria for asset security identification 302.

Once the weight is applied to the applications based on the criteria, an asset value is calculated, as illustrated in block 338. The asset value may be bunched into a low, medium, high, and critical score range. Subsequently, as illustrated in block 340, the asset security value is applied to an interactive graphical interface for exposing application vulnerabilities. The asset security values may be applied to an axis of the graphical interface. In order to fully extract key applications, an additional element may be included on one or more alternative axis. In some embodiments, application characteristic variables may be include on the alternative axis. In this way, a user may be able to, via customization, implement application characteristic variables into the graphical interface along with the asset security value to get a visualization of the key applications effecting security in the user's area.

FIG. 4 provides a high level process flow illustrating the process of generating application characteristic variables for the engine 400, in accordance with an embodiment of the invention. As illustrated in block 402, the process 400 is initiated by identifying application characteristic variables associated with each of the applications available to the entity. As illustrated, a representation of the application characteristic variables is provided. One of ordinary skill in the art will appreciate that there may be one or more additional application characteristics not listed. The system generates filters on the interactive interface for a user to utilize in order to identify key applications of interest. Each filter may include privacy 404, leadership 406, third party 408, critical 410, vulnerabilities 412, continuity 414, asset information 416, and/or accessibility 418. The privacy 404 filter may include an identification of and filtering of applications based on a sensitivity class 420 associated with the application, flags 422 generated by individuals associated with the application, and an identification of the application containing non-public data 424. In this way, the user may filter the applications depending on a level of privacy requirements associated with the security issues wishing to be identified. The leadership 406 filter may include an identification of and filtering of applications based on region 426 and organization 428 associated with the leadership requesting the security information. As such, different security issues may arise for a team in one region of the country or world relative to a team in a different region. In this way, the leadership requesting the information may have varying geographic requirements associated with the security issues wishing to be identified. The third party 408 filter may include an identification of and filtering of applications based on whether the application is external 430, the relationship the user or entity has with the vendor 432, or the requirements of third party technology 434 to run the application. As such, the user may be able to filter applications based on the amount of third party involvement in the functionality of the application. The critical 410 filter may include an identification of and filtering based on regulatory requirements 436 or compliance requirements 438. In this way, the user may filter applications based on regulator or compliance issues arising in the location or business line the user is searching within. The vulnerabilities 412 filter may include an identification of and filtering of applications based on application 440, server 442, or status 444. In this way, the user may filter applications based on vulnerabilities identified in the application, the server or the status of the application. The continuity 414 filter may include an identification of and filtering of applications based on a recovery time 446 required or technology changes for the applications. In this way, the user may filter applications based on technology delays or changes associated with the applications to identify additional security issues that may arise based on those delays or changes. The asset information 416 filter may include an identification of and filtering of applications based on technology 448 or asset security score 450. In this way, the user may filter applications based on asset information, such as the technology involved in running the application or the pre-existing security score associated with the application. The accessibility 418 filter may include an identification of and filtering of applications based on public 452 accessibility or flags 454. In this way, the user may filter the applications based on the accessibility, whether public, private, or the like, to the data on the application.

Next, as illustrated in block 456, the process 400 continues by applying the application characteristic variables to the filter section of the engine for selection and deployment into an interactive graphical interface for exposing application vulnerabilities based on a user search.

FIG. 5 provides an illustration of the process of using the engine to expose vulnerabilities 500, in accordance with an embodiment of the invention. In this way, the engine may be used to search applications via an interactive graphical interface comprising an x-axis with asset security values and a y-axis with application characteristic variables selected by the user. As illustrated in block 502, the process 500 is initiated by presenting an interactive graphical interface to an authorized user. The interface is further illustrated below with respect to FIG. 6. The graphical interface is provided to a user based on authorization of the user having access to the engine. As such, in some embodiments, the user may have to sign into the interface via a username and password, or the like.

Next, as illustrated in block 504, the system may adjust the applications on the interface by positioning the weighted asset security values on the graphical interface. In this way, the asset security values may be presented in an ascending order across an x-axis on a graphical interface. Once the asset security values are presented on the engine, the system presents the filters of the application characteristic variables for the user to select and filter via the interactive interface. As such, as illustrated in block 506, the process 500 allows filter selection of application characteristics factors via dials and levers.

Once the engine has ran the asset security values, stored the application characteristic variables as filters, received authorized user access, and received filter selections from the user, the system may present a graphical representation of asset security values relative to the selected filters, as illustrated in block 508. Next, as illustrated in block 510, the process allows interaction with graphical representation for drill down presentation of relevant applications. The drill down is possible by selection of one or more indicators corresponding to applications. In this way, each indicator represents an application. The indicators are selectable to provide more detailed information regarding the application associated with the indicator.

As illustrated in block 512, the process 500 is finalized by providing the user with security details for the selected applications visualized via the interactive graphical interface. In this way, the user may be able to identify the applications of interest to him/her and review the potential security issues associated therewith.

FIG. 6 provides an interface associated with the engine 600, in accordance with embodiments of the invention. In this way, the user may be presented with the interactive graphical representation illustrated in the interface 600. The interface 600 may include a dot plot wherein each dot or symbol represents an application along the graph. As illustrated in block 606, the user may select filters 606 on the application characteristic variables as illustrated above in FIG. 4. The filters 606 are presented and allowed to be manipulated by the user via dials 610, levers 612, a scalable system 614, and/or via check boxes 616.

Once the user has set his/her filters 606 based on the user's requirements for security issue identification, the system plots the interactive graphical interface. The interactive graphic interface plots the applications across an x and y axis, as illustrated in the graphical representation plot 601. Each symbol of in the graphical representation represents an application within the entity infrastructure. The x-axis includes the asset security value 604. Along the x-axis the applications are plotted. The direction of the arrow indicates an increase in the asset security value 604. As illustrated in FIG. 3 the asset security value is calculated via a number of criteria in a weighted manner. The asset security value is plotted along the x-axis in an increasing manner.

In order to expand the applications across and about the graphical interface, the y-axis includes a sum of the filters 606 selected by the user. As such, the sum of application characteristic variables 602 is presented along the y-axis. In this way, the application characteristic variables illustrated in FIG. 4 may provide the user with filters that the user may select to be included on the y-axis. In this way, the y-axis may increase in number of times a characteristic variable is triggered if selected by the user. For example, if the user selects third party characteristics as a variable to visualize, an application may have 0 triggers in some embodiments. In other embodiments, the application may have multiple third party characteristics, therefore have a trigger of more than 0. In this way, the plot along the y-axis will include the number of triggers for that application.

As such, the graph may include an increasing asset security value 604 on the x-axis and a sum of application characteristic variables 602 may be presented in an increasing manner on the y-axis. As such the upper right quadrant of the plot 601 may include applications that have high sum of application characteristic variables 602 and high asset security values 604. The applications indicated in the upper right quadrant of the plot 601 may comprise the applications that the user may desire to examine closer based on the user's filter selection as being applications more relevant to the user's requests.

Since the graphical interface 600 is interactive, the user may select a single indicator associated with an application or the user may highlight a portion of the plot 601 highlighting several indicators, each associated with an application. Once highlighted, selected, clicked on, or the like, the graphical interface 600 presents on-demand details 608 to the user associated with the selected applications. The on-demand details 608 presented in the graphical interface 600 include information associated with the applications. In this graphical interface 600 Application 1, Application 2, Application 3, and Application 4 are included herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing.

Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for exposing application vulnerability, the system comprising:
 a memory device with computer-readable program code stored thereon;
 a communication device;
 a processing device operatively coupled to the memory device and the communication device, wherein the processing device is configured to execute the computer-readable program code to:

compile, across an entirety of an entity, applications available within the entity and applications hosted externally into a centralized location database;

examine information security criteria and business criteria for compiled applications, wherein the information security criteria includes compiled applications' capability to access, control and report on financial transactions and access to non-public personal user information, and business criteria includes expected number of peak concurrent users for the compiled applications, required downtime during an outage or refresh of the compiled applications, and number of additional downstream applications dependent on the compiled applications;

generate a weighted asset security value based on the information security criteria and the business criteria for each of the compiled applications;

identify application characteristic variables in the compiled applications, wherein application characteristic variables include internal or external application hosting, compliance requirements, financial regulatory requirements, recovery times, and application privacy requirements;

present to a user an interface communicated to the user via a secure communicable link, wherein the interface comprises selectable filters associated with the application characteristics;

generate an interactive graphical interface comprising graphical axis, wherein one axis comprises the weighted asset security value, a second axis comprises filtered application characteristics, and an alternative axis comprising the application characteristic variables, wherein the compiled applications are represented by selectable indicators within the interactive graphical interface for drill down presentation of applications and security details, and wherein application characteristic variables are selected via dials and levers; and present on demand, based on selecting one or more complied applications, detailed information about one or more applications selected or highlighted in the interactive graphical interface via the alternative axis, wherein the alternative axis includes the one or more selected application and the application characteristic variables corresponding to the one or more selected applications for security follow up.

2. The system of claim 1, wherein generating the interactive graphical interface comprises plotting the compiled applications as indicators across an x-axis comprising the weighted asset security value and a y-axis comprising the filtered application characteristics, wherein the indicators are selectable and present detailed real-time information about the compiled applications associated with the indicators.

3. The system of claim 1, wherein examining information security criteria comprises identifying the compiled applications that include non-public information and third party managed information, wherein examining business criteria for the compiled applications comprises identifying a peak of concurrent uses and a restore time for each of the compiled applications.

4. The system of claim 1, further comprising storing the weighted asset security value permanently for each of the compiled applications.

5. The system of claim 1, wherein identifying application characteristic variables in the compiled applications available across the entity further comprises identifying the compiled applications associated with variables in privacy, leadership, third party contacts, criticality, vulnerabilities, continuity, asset information, and accessibility.

6. The system of claim 1, wherein presenting on demand detailed information about the one or more applications selected or highlighted in the interactive graphical interface for security follow up, further comprises presenting the user with security detail specifics for each of the one or more applications to expose application vulnerabilities relevant to the filters.

7. A computer program product for exposing application vulnerability, the computer program product comprising at least one non-transitory computer-readable medium having computer-readable program code portions embodied therein, the computer-readable program code portions comprising:

A system for exposing application vulnerability, the system comprising:

a memory device with computer-readable program code stored thereon;

a communication device;

a processing device operatively coupled to the memory device and the communication device, wherein the processing device is configured to execute the computer-readable program code to:

an executable portion configured for compiling, across an entirety of an entity, applications available within the entity and applications hosted externally into a centralized location database;

an executable portion configured for examining information security criteria and business criteria for compiled applications, wherein the information security criteria includes compiled applications' capability to access, control and report on financial transactions and access to non-public personal user information, and business criteria includes expected number of peak concurrent users for the compiled applications, required downtime during an outage or refresh of the compiled applications, and number of additional downstream applications dependent on the compiled applications;

an executable portion configured for generating a weighted asset security value based on the information security criteria and the business criteria for each of the compiled applications;

an executable portion configured for identifying application characteristic variables in the compiled applications, wherein application characteristic variables include internal or external application hosting, compliance requirements, financial regulatory requirements, recovery times, and application privacy requirements;

an executable portion configured for presenting to a user an interface communicated to the user via a secure communicable link, wherein the interface comprises selectable filters associated with the application characteristics;

an executable portion configured for generating an interactive graphical interface comprising graphical axis, wherein one axis comprises the weighted asset security value, a second axis comprises filtered application characteristics, and an alternative axis comprising the application characteristic variables, wherein the compiled applications are represented by selectable indicators within the interactive graphical interface for drill down presentation of applications and security details, and wherein application characteristic variables are selected via dials and levers; and an executable portion configured for presenting on demand, based on selecting one or more complied applications, detailed information about one or more applications selected or highlighted in the interactive graphical interface via the alternative axis, wherein the alternative axis includes the one or more selected application and the application characteristic variables corresponding to the one or more selected applications for security follow up.

8. The computer program product of claim 7, wherein generating the interactive graphical interface comprises plotting the compiled applications as indicators across an x-axis comprising the weighted asset security value and a y-axis comprising the filtered application characteristics, wherein the indicators are selectable and present detailed real-time information about the compiled application associated with the indicators.

9. The computer program product of claim 7, wherein examining information security criteria comprises identifying the compiled applications that include non-public information and third party managed information, wherein examining business criteria for the compiled applications comprises identifying a peak of concurrent uses and a restore time for each of the compiled applications.

10. The computer program product of claim 7, further comprising an executable portion configured for storing the weighted asset security value permanently for each of the compiled applications.

11. The computer program product of claim 7, wherein identifying application characteristic variables in the compiled applications available across the entity further comprises identifying the compiled applications associated with variables in privacy, leadership, third party contacts, criticality, vulnerabilities, continuity, asset information, and accessibility.

12. The computer program product of claim 7, wherein presenting on demand detailed information about the one or more applications selected or highlighted in the interactive graphical interface for security follow up, further comprises presenting the user with security detail specifics for each of the one or more applications to expose application vulnerabilities relevant to the filters.

13. A computer-implemented method for exposing application vulnerability, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
compiling, across an entirety of an entity, applications available within the entity and applications hosted externally into a centralized location database;
examining information security criteria and business criteria for compiled applications, wherein the information security criteria includes compiled applications' capability to access, control and report on financial transactions and access to non-public personal user information, and business criteria includes expected number of peak concurrent users for the compiled applications, required downtime during an outage or refresh of the compiled applications, and number of additional downstream applications dependent on the compiled applications;
generating a weighted asset security value based on the information security criteria and the business criteria for each of the compiled applications;
identifying application characteristic variables in the compiled applications, wherein application characteristic variables include internal or external application hosting, compliance requirements, financial regulatory requirements, recovery times, and application privacy requirements;
presenting to a user an interface communicated to the user via a secure communicable link, wherein the interface comprises selectable filters associated with the application characteristics;
generating an interactive graphical interface comprising graphical axis, wherein one axis comprises the weighted asset security value, a second axis comprises filtered application characteristics, and an alternative axis comprising the application characteristic variables, wherein the compiled applications are represented by selectable indicators within the interactive graphical interface for drill down presentation of applications and security details, and wherein application characteristic variables are selected via dials and levers; and
presenting on demand, based on selecting one or more complied applications, detailed information about one or more applications selected or highlighted in the interactive graphical interface via the alternative axis, wherein the alternative axis includes the one or more selected application and the application characteristic variables corresponding to the one or more selected applications for security follow up.

14. The computer-implemented method of claim 13, wherein generating the interactive graphical interface comprises plotting the compiled applications as indicators across an x-axis comprising the weighted asset security value and a y-axis comprising the filtered application characteristics, wherein the indicators are selectable and present detailed real-time information about the compiled applications associated with the indicators.

15. The computer-implemented method of claim 13, wherein examining information security criteria comprises identifying the compiled applications that include non-public information and third party managed information, wherein examining business criteria for the compiled applications comprises identifying a peak of concurrent uses and a restore time for each of the compiled applications.

16. The computer-implemented method of claim 13, wherein identifying application characteristic variables in the compiled applications available across the entity further comprises identifying the compiled applications associated with variables in privacy, leadership, third party contacts, criticality, vulnerabilities, continuity, asset information, and accessibility.

17. The computer-implemented method of claim 13, wherein presenting on demand detailed information about the one or more applications selected or highlighted in the interactive graphical interface for security follow up, further comprises presenting the user with security detail specifics for each of the one or more applications to expose application vulnerabilities relevant to the filters.

* * * * *